UNITED STATES PATENT OFFICE.

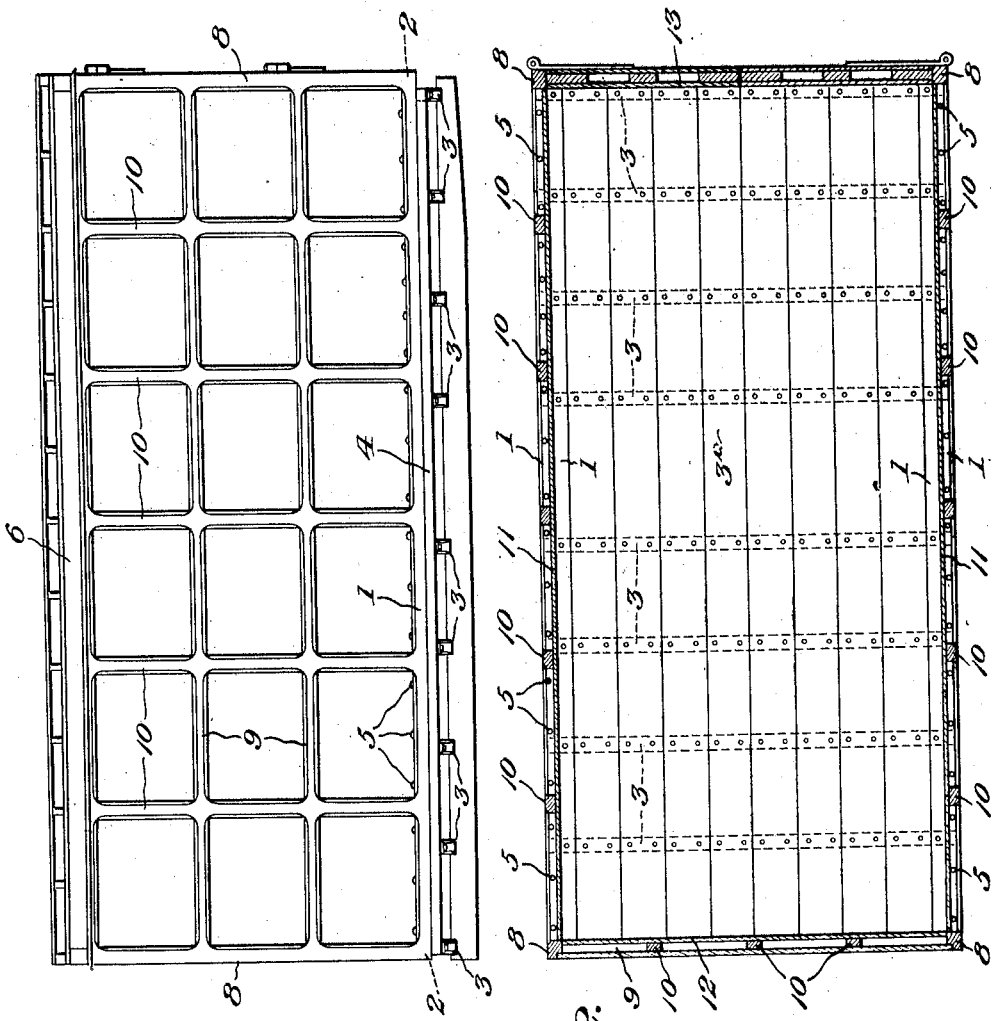

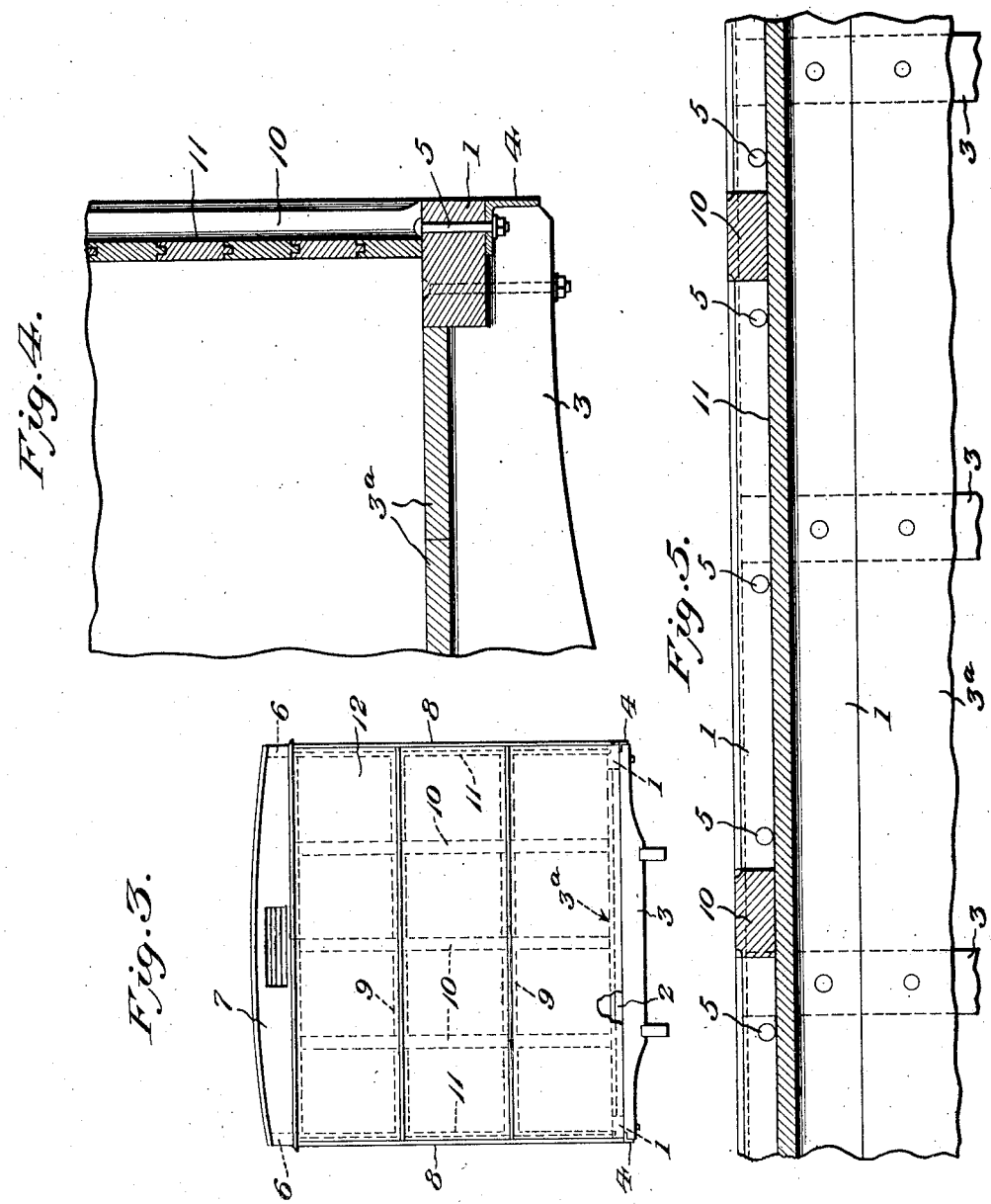

HARRY G. MOORE, OF PHILADELPHIA, PENNSYLVANIA.

TRUCK-BODY CONSTRUCTION.

1,356,459.  Specification of Letters Patent.  Patented Oct. 19, 1920.

Application filed October 22, 1918. Serial No. 259,244.

*To all whom it may concern:*

Be it known that I, HARRY G. MOORE, a citizen of the United States, residing at Philadelphia, in the county of Philadelphia and State of Pennsylvania, have invented new and useful Improvements in Truck-Body Construction, of which the following is a specification.

My present invention has to do with the manner of constructing the bodies of trucks and especially closed or van bodies.

As constructed at present when a bottom sill or cross beam of a truck body breaks, the entire body is liable to be twisted out of shape and rendered unfit for use.

One of the objects of my present invention is to provide a truck body construction predicated upon the theory that vibrations expand as they travel from the point of their creation and designed and adapted to preclude distortion or material injury to the body as a whole, in the event of one of the bottom sills or one of the cross beams of the body being broken.

Another object of my invention is the provision of a truck body construction that is at once exceedingly strong and is calculated to afford a smooth and even surface in the interior of the body.

To the attainment of the foregoing the invention consists in the peculiar construction, novel and useful combinations, and the adaptation of parts, hereinafter described and definitely claimed.

In the accompanying drawings, which are hereby made a part hereof:

Figure 1 is a side elevation of a truck body constructed in accordance with my invention.

Fig. 2 is a horizontal section of the same.

Fig. 3 is an end elevation of the body.

Fig. 4 is an enlarged detail cross section.

Fig. 5 is an enlarged detail horizontal section.

Similar numerals of reference designate corresponding parts in all of the views of the drawings.

The lower portion of my novel truck body construction comprises side sills 1, end sills 2, and transverse beams 3 for the floor 3ª of the body, which floor may be of any approved construction. The lower portion of the construction also comprises angle irons 4, bolted at 5 to the sills 1 and arranged as shown relatively to the beams 3 so as to receive the ends of the beams with the result that said ends abut against and into the angle irons. From this it follows that in the event of a sill 1 or 2 or a transverse beam 3 breaking, the body will not be distorted or thrown out of shape or broken. On the other hand the angle iron provision will have the effect, not only of lessening the liability of the sills breaking, but in case of any one of the side sills breaking, the angle iron positioned below the broken sill will serve to maintain the sections thereof in proper working position and in that way will preserve the shape of the body, and, in a measure, will maintain the body in good working condition for an indefinite period.

My novel body also comprises an upper frame made up of side bars 6 and end bars 7, corner posts 8, side and end open-work frames, the horizontal and vertical bars 9 and 10 of which are fixed at right angles to each other, with the ends of the horizontal bars mortised into the corner posts and the ends of the vertical bars mortised into the sills and the upper frame bars, and side and ends walls 11 and 12. These walls 11 and 12 are composed of boards having tongues and grooves, Fig. 4, the boards being nailed or otherwise attached to the inner sides of the interposed open-work frames, with the result that a perfectly smooth and even surface is provided at the inner side of each wall. I would have it understood, however, that it is within the purview of my invention to break the joints between the boards of the walls 11 and 12 in any approved manner. I would also have it here understood that the door 13 of the body is provided with a smooth and even inner surface, and that when a plurality of doors is employed they will all be similarly equipped. The boards in the walls 11 and 12 are preferably horizontal as shown.

As will be appreciated from the foregoing an important feature of my invention resides in the fact that without lessening the carrying capacity of the body, the open-work side and end frames lend great stiffness and strength thereto, the same being due to the interposition of the said frames between the upper frame, the corner posts and the sills.

It will also be appreciated that the open-work side and end frames serve in conjunction with the angle-iron provision in preventing distortion or breakage of the body under shocks, strains and blows.

Having described my invention what I claim and desire to secure by Letters-Patent is:

1. A truck body construction, comprising side and end sills, side and end frame bars spaced above said sills, side and end openwork frames interposed between and mortised into said sills and bars, walls formed of superimposed, joined boards, secured to the inner sides of the said frames to afford smooth and even interior surfaces, angle irons disposed under and against the side sills and connected thereto, and cross beams, the ends of which are disposed in and against the side angle irons and connected to the side sills.

2. In a truck body, the combination of side and end sills, side angle irons disposed under and against the side sills and connected thereto, and cross beams, the ends of which are disposed in and against said side angle irons.

In testimony whereof I affix my signature.

HARRY G. MOORE.